UNITED STATES PATENT OFFICE.

WILHELM EWALDT, OF HAMBURG, GERMANY.

DESICCATED AND POWDERED FOOD.

SPECIFICATION forming part of Letters Patent No. 261,214, dated July 18, 1882.

Application filed February 7, 1882. (No specimens.)

*To all whom it may concern:*

Be it known that I, WILHELM EWALDT, of Hamburg, Germany, have invented certain new and useful Improvements in Processes of Desiccating Liver for Food; and I do hereby declare that the following is a full, clear, and exact description of the invention, which will enable others skilled in the art to which it appertains to make and use the same.

The object of this invention is to make from the liver of animals a cheap food for human beings, which shall be durable when kept for use, and savory and healthful when cooked.

The nature of the invention consists in desiccating animal liver, and then grinding it to a very fine powder, that is not affected by the temperature or moisture of the atmosphere.

The process of preparing this improved food is as follows: The animal liver is first thoroughly cooled from all animal heat, and is then thoroughly cleansed by soaking it for about fifteen minutes in clean water at a temperature not exceeding 10° Reaumur. After being thus cooled and cleansed, it must be boiled or steamed with clean water in metal vessels until it becomes a light brown in color and slightly harder than in nature, and presents an even hardness to the probe throughout. It will require in time from about one-half to three-quarters of an hour to produce the foregoing results by constant boiling or steaming. Too much or too long boiling or steaming will greatly harden and disintegrate the liver and again change its color to a darker brown. When the liver has been thus properly boiled or steamed and thereafter allowed to cool slightly it must be ground with metallic machinery into a finely-granulated mass. This mass must then be spread about three inches thick in metallic drying-pans set upon water, with the intervening bottom of each pan about one-fourth of an inch in thickness. The water underneath the pans must be placed and kept by steam or fire at a temperature ranging from 35° to 60° Reaumur (45° to 75° centigrade) for a time ranging from two to three hours, during all which time the mass in the pans must be constantly and thoroughly stirred with a hoe-shaped instrument of wood or burnished iron or steel. The time of stirring and drying the mass will be in proportion to the temperature of the water underneath the pans, the greater the temperature the less the time and the more vigor in stirring required. When the mass becomes dry and a somewhat darker brown in color, the pans containing the mass should be at once removed from the water and placed where the mass will quickly cool, and there left until the mass has been reduced to a temperature of 8° Reaumur, (10° centigrade.) This cooling can be better done by emptying the mass from the pans upon a clean wooden surface and spreading it with a wooden or burnished steel or iron instrument to a layer about two inches thick upon such cooling-surface. During the steaming or boiling process or the drying or cooling processes, the mass should never be pressed together. When the mass has been cooled, as before directed, then it must be ground with metallic machinery to a very fine powder. This powder can be packed in tierces or lesser-sized wooden vessels or boxes, and can thus be shipped into or through any climate, if kept free from water.

This food may be kept as easily as flour or meal, and makes a most delightful sausage or other ground-meat preparation. In use the powder must be placed in clean pure water at a temperature just below the boiling-point, and there be allowed to remain for about thirty minutes. When removed from the fire or water it may be seasoned to taste and eaten, or stuffed in sausage-skins and slightly cooked; or it may be further cooked in any way and to any degree to suit the taste.

I claim as my invention and desire to secure by Letters Patent—

As a new article of manufacture, cooked, desiccated, and comminuted liver.

In testimony that I claim the foregoing as my own I have hereto affixed my signature in presence of two witnesses.

WILHELM EWALDT.

Witnesses:
GEORGE SEIDENSTICKER,
LORENZ MUNIDI.